3,322,685
CATALYST FOR MANUFACTURE OF
TETRAMETHYLLEAD
Paul Kobetz and Francis M. Beaird, Baton Rouge, La., assignors to Ethyl Corporation, New York, N.Y., a corporation of Virginia
No Drawing. Original application Aug. 31, 1962, Ser. No. 220,881, now Patent No. 3,192,240, dated June 29, 1965. Divided and this application Apr. 28, 1965, Ser. No. 451,636
12 Claims. (Cl. 252—429)

This application is a division of our co-pending application Ser. No. 220,881, filed Aug. 31, 1962, now Patent No. 3,192,240, entitled, "Process for Manufacture of Tetramethyllead."

This invention relates to the manufacture of alkyllead compounds. More particularly, the invention relates to a new and improved process fort he manufacture of a tetramethyllead product.

It is known that the tetraalkyllead compounds can be made by the reaction of an alkali metal lead alloy and an alkyl halide, particularly, the monosodium lead alloy, NaPb and the corresponding alkyl chloride. This type of synthesis reaction has been employed for making large amounts of tetraethyllead. The chemical reaction is entirely operative for other tetraalkylleads, and of recent periods considerable interest has developed in the manufacture and use of tetramethyllead, which is an appreciably more volatile lead antiknock compound.

In the case of tetramethyllead, the yields obtained are not as high as desired. Thus yields of the order of 70 percent are reported, and under carefully controlled laboratory conditions, yields of about 77–78 percent can be obtained. Such results are achieved using, for example, a hydrocarbon aluminum compound as a catalyst and in the presence of a small quantity of an inert hydrocarbon liquid. Such liquids, desirably employed in the proportions of about one-twenty-fifth to one-fifth part by weight per part of alloy, serve apparently as adjuvants to the catalyst and provide the above mentioned yields at moderate reaction conditions. Difficulty is frequently encountered, however, in discharging the product of a reaction, such "reaction masses" containing large proportions of subdivided lead metal released by the reaction and sodium chloride formed, as well as the tetramethyllead formed.

An object of the present invention is to provide a new and improved process for making tetramethyllead. An even more particular object is to provide a new process for making tetramethyllead in high and efficient yields. Another object is to provide an improvement in tetramethyllead manufacture whereby high yields are obtained, and also the discharge of a reaction mass is greatly expedited and the incidence of reactive catalyst component residues in a reaction mass is greatly reduced. An additional object is to provide a new and novel catalyst system having a plurality of at least two components and exhibiting unusual and unexpected properties and attributes.

It has now been discovered that tetramethyllead can be synthesized in the presence of a new catalyst system, and that high yields and other benefits not heretofore available, can be realized. The process of the invention comprises the reaction of sodium lead alloy and methyl chloride in the presence of a catalytic amount of the catalyst system, which in all instances includes an aluminum component and an organic compound having at least one glycol ether grouping therein. The aluminum catalyst is usually a hydrocarbon aluminum compound, but also can be finely subdivided aluminum metal or an aluminum trihalide such as the trichloride, tribromide, or triiodide. By hydrocarbon aluminum compound is meant those organometallic aluminum compounds having at least one hydrocarbon radical per aluminum atom, the remaining bonds of the aluminum being satisfied by hydrogen, other hydrocarbon radicals or by other radicals or elements which are innocous or not detrimental to the reaction. As described more fully below, a wide variety of hydrocarbon aluminum compounds are suitable, including, typically, trialkyl aluminum compounds and numerous others as illustrated herein.

The catalyst system or composition also includes, as stated, an organic compound having at least one glycol ether grouping, this being the group represented by the expression

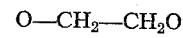

The terminal bonds of a single group are satisfied by hydrocarbon radicals or additional glycol ether groups. The foregoing attribute is found not only in diethers of glycols, but in certain other categories of compounds. Thus among the types of compounds effective as a component of the catalyst system are the lower dialkyl ethers of lower polyethylene glycols, cyclic diethers, dialkoxy lower alkanes, and alkyl ethers of methyl tetrhydrofuran. Good results are obtained with catalyst systems following the above requirements, viz., having the hydrocarbon aluminum compound plus only one organocompound having the glycol ether grouping, but in certain preferred embodiments, a plurality of the latter components are provided and additional benefits are accrued which are highly valuable in certain environments.

Typical hydrocarbon aluminum compounds which are suitable include trimethyl aluminum, triethyl aluminum, ethyl aluminum sesquichloride, diethyl aluminum chloride, ethyl aluminum dichloride, tri-n-propyl aluminum, tri-n-butyl aluminum, triisobutyl aluminum, diisobutyl aluminum hydride, triphenyl aluminum, trioctyl aluminum, diethyl aluminum hydride, diethyl aluminum ethoxide, and others. Generally, then, aluminum compounds having at least one hydrocarbon radical having from one to about ten carbon atoms are fully suitable for use. The simpler alkyl aluminum compounds, such as mentioned illustratively above, are preferred. When desired, the hydrocarbon aluminum catalyst component can be generated in situ, as, for example, by the reaction of an aluminum trihalide with a hydrocarbon compound of another metal. Thus, the reaction of aluminum trichloride and tetraethyllead will generate hydrocarbon aluminum moieties operative at this catalyst component.

The lower dihydrocarbon ethers of the lower polyethylene glycols are one type of co-catalysts and are similarly not restricted to isolated specimens. The term dihydrocarbon includes both those diethers having two identical hydrocarbon groups, and also those having dissimilar hydrocarbon groups, as, for example, the methyl ethyl ether of diethylene glycol. By lower polyethylene glycol is meant those compounds having in series up to about six or seven glycol groups, i.e.

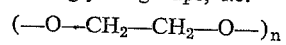

wherein $n$ is up to about 7. Generally it is preferred to employ those members of this group having up to and including four such groups or moieties, the ethers of diethylene glycol being especially preferred. The hydrocarbon radicals of these materials can be aryl, cycloalkyl, alkaryl, aralkyl, or similar alkyl groups. Simple alkyl groups of up to ten carbon atoms are preferred, the normal alkyl groups of one to four carbons being especially preferred.

In carrying out the process, by a batch or cyclic technique, a reaction zone is charged with subdivided solid alloy, usually the monosodium lead alloy, although some variation from this is permissible, and then the co-catalyst system is charged. Various modes of charging can be employed, and for particular catalyst systems, there can be minor benefits associated with a particular mode. Thus, effective modes include adding separately the aluminum catalyst component and the co-catalyst or synergist portion, or pre-mixing these components, or adding one or both of the components in several increments separated by short time intervals.

Frequently, the initial charge also includes an inert liquid hydrocarbon, in limited proportions. Usually, suitable proportions are from about one-twenty-fifth to about one-fifth of the alloy by weight. The hydrocarbon is particularly beneficial according to prior processes using only a hydrocarbon aluminum catalyst, as in such instances, the hydrocarbon results in a greater effectiveness of single catalyst components. In the present invention, the hydrocarbon is usually optional but generally beneficial. The hydrocarbon promotes the stability of the tetramethyllead product after recovery from the reaction mass. A wide choice is available for selection of an inert liquid hydrocarbon, commercial toluene being a particularly suitable material. As already stated, the use of the hydrocarbon is optional, and good results are obtained without such a material.

After the above described charge, the reactor is sealed except for necessary venting connections. The temperature is raised to, usually, at least 65° C. or above, while the system is agitated, and methyl chloride is charged. The methyl chloride in some cases is charged all at one time, and in other cases is fed over a deliberate finite period. The total methyl chloride is provided in proportions of at least one stoichiometric requirement or theory, and usually, a substantial excess is used. It will be understood that this refers to the total quantity fed during batch operations. During portions of such cyclic operations, only minor quantities of methyl chloride may be present, when the feed is "spread out" over a finite period.

The materials thus charged together are then reacted at temperatures averaging from about 85 to 110° C. Agitation is provided throughout the reaction period, as the reacting system includes solids and volatile liquids. The reaction is continued to completion, requiring from about one hour and less than seven hours, dependent on the configuration of the apparatus, the degree of agitation, and the quantity of alloy to be reacted.

On completion of the reaction, the autoclave and contents are cooled and discharged, and the tetramethyllead is recovered from the lead and alkali metal chloride components of the reaction mass. When small portions of hydrocarbon additive are employed in the synthesis reaction the tetramethyllead is usually accompanied on recovery by said hydrocarbon liquid.

As already noted, the present invention provides high yields, in addition to other benefits. To illustrate the general mode of operation, and the results heretofore obtained, a series of "base line" operations were conducted, showing generally the procedure already mentioned, except that the only additives or catalysts for the process were hydrocarbon aluminum compounds, and no components having a glycol ether grouping were provided.

In these operations, in each run, an autoclave was charged with 1,000 parts of comminuted monosodium lead alloy, containing 10 weight percent sodium. A mixture of an aluminum type catalyst, dissolved in anhydrous toluene, was then charged, while agitating the contents of the autoclave. The said solution was provided in proportions of about 54 parts toluene by weight, and the aluminum catalyst was charged in proportions of about 0.24 weight percent aluminum content based on the alloy charged. According to the identity of the aluminum catalysts, of course, the weight of the catalyst compound would be varied. Thus, in the case of using methyl aluminum sesquichloride, $(CH_3)_3Al_2Cl_3$, as the aluminum type catalyst, a typical concentration was about 9.26 parts per 1,000 parts of the monosodium lead alloy charged.

The charge thus established was then sealed in the autoclave and preheated to about 95° C., and then methyl chloride was fed to the autoclave interior. The temperature was controlled below about 110° C., and the methyl chloride was fed during a period of less than about 30 minutes in proportions corresponding to 1.7 "theories," or about 370 parts by weight per 1,000 parts of the alloy charged.

Upon completion of the reaction, after additional reaction for a period of approximately two hours, the contents of the autoclave were cooled and removed from the interior. The amount of tetramethyllead produced was determined by its extraction from the reaction mixture, or reaction mass, with a hydrocarbon solvent and by reaction of the tetramethyllead with iodine of an aliquot of the liquid extract, followed by back titration. Alternatively, in some instances, the reaction mass was subjected to steam distillation, for separation of the tetramethyllead from the excess lead solids and sodium chloride component of the reaction mass.

A series of operations as above described was carried out, using the procedure indicated and with occasional slight variation in the amount of catalyst provided. Using triethyl aluminum as the catalyst, the average yield in a substantial number of operations obtained was 77.9 percent, and when using methyl aluminum sesquichloride as a catalyst in comparable concentrations, the average yield was 76.8 percent.

The reaction mass attained in the above described base line runs was quite reactive, in that, when portions were exposed to the atmosphere, considerable fuming occurred. The fuming is attributed to the existence in the reaction mass of aluminum hydrocarbon moieties, expressed as AlR. These groups, wherein Al is the monovalent equivalent and R is a hydrocarbon or a hydrogen, are capable of reacting with oxygen and releasing microscopic particles of aluminum oxide. These particles are so fine that they appear as a fog and tend to foul heat exchange surfaces in recovery equipment.

To illustrate the operation of the present invention, the following working examples are given.

*Example 1*

In this operation, the procedure described for the base line runs was followed, except that the aluminum catalyst, in this case triethyl aluminum, was provided in the proportions of 0.46 weight percent, based on the alloy, and in addition dimethyl ether of diethylene glycol was concurrently charged, in the proportions of about ¾ mole per mole of the triethyl aluminum. This corresponds to a concentration of 0.11 wt. percent aluminum.

Upon completion of the reaction, it was found that a yield of 93 percent of tetramethyllead had been obtained, representing a yield improvement of 15 percent above the results obtained according to the base-line procedure. In addition, inspection of the reaction mass produced by the process showed that it was not sticky or lumpy, and could be readily discharged from the autoclave without being significantly air-sensitive, viz., did not exhibit fuming when contacted with air.

In the foregoing example, as indicated, the aluminum catalyst plus the dimethyl ether of diethylene glycol were added at substantially the same time. In other operations, alternative modes of introducing the plural catalyst components have been employed. These include the following:

Reverse addition—the synergist co-catalyst is added and thereafter the aluminum catalyst is provided.

Premixed addition—in this operation, the aluminum catalyst, and the synergist cocatalyst of the present invention, with or without a hydrocarbon, are mixed together prior to adding to the autoclave charge.

In other instances, the catalyst system, viz., the aluminum alkyl plus the synergist, are added in delays, or increments spaced apart by several minutes, but within the first 15 minutes or one-half hour of reaction. As is exhibited by the following tabulated examples, these various modes of addition are all quite satisfactory.

To illustrate the scope of the present invention more fully, the following table cites the results obtained in additional working examples, wherein the catalyst system included the hydrocarbon aluminum compound and a dialkyl ether of a lower polyethylene glycol.

the synergestic co-catalyst component according to the present improvement. A determination was made, for each operation, of the quantity of the reaction mass discharged from an autoclave by mechanical means associated therewith. This study showed that from 68 to 72 percent of the reaction mass was discharged following each run, the average being 71.4 percent.

When the same operations were repeated, but the catalyst included methyl aluminum sesquichloride and a lower dialkyl ether of a lower polyethylene glycol, substantial improvement in the amount of discharge following

| Ex. | Aluminum Hydrocarbon Component | | Lower Alkyl Ether of Lower Polyethylene Glycol | | Catalyst Feed | Hydrocarbon, if any | TML Yield, Percent | Increase Over Base Line, Percent |
|---|---|---|---|---|---|---|---|---|
| | Identity | Concentration Al, Wt. Percent of Alloy | Identity | Moles/Gm. Atom. Al | | | | |
| 2 | $(C_2H_5)_3Al$ | 0.12 | Dimethyl ether of diethylene glycol. | 0.5 | Reverse | Toluene | 89.6 | 11.7 |
| 3 | $(C_2H_5)_3Al$ | 0.11 | ...do... | 0.75 | Normal | ...do... | 81.2 | 3.3 |
| 4 | $(C_2H_5)_3Al$ | 0.11 | ...do... | 0.77 | ...do... | ...do... | 82.8 | 4.9 |
| 5 | $(C_2H_5)_2AlH$ | 0.105 | ...do... | 0.36 | Reverse | ...do... | 89.3 | 11.4 |
| 6 | $(C_2H_5)_2AlH + (C_2H_5)_3Al$ | 0.12 | ...do... | 0.50 | ...do... | ...do... | 90.3 | 12.4 |
| 7 | $(CH_3)_3Al_2Cl_3$ | 0.12 | ...do... | 0.69 | ...do... | ...do... | 90.7 | 13.9 |
| 8 | $(CH_3)_3Al_2Cl_3$ | 0.12 | ...do... | 0.69 | ...do... | ...do... | 89.8 | 13.0 |
| 9 | $(CH_3)_3Al_2Cl_3$ | 0.12 | ...do... | 0.69 | Normal | ...do... | 90.6 | 13.8 |
| 10 | $(CH_3)_3Al_2Cl_3$ | 0.12 | ...do... | 0.69 | ...do... | ...do... | 91.6 | 14.8 |
| 11 | $(CH_3)_3Al_2Cl_3$ | 0.092 | ...do... | 1.35 | ...do... | ...do... | 94.3 | 17.5 |
| 12 | $(CH_3)_3Al_2Cl_3$ | 0.12 | Diethyl ether of diethylene glycol. | 0.53 | Delay | ...do... | 87.0 | 10.2 |
| 13 | $(CH_3)_3Al_2Cl_3$ | 0.12 | ...do... | 0.53 | ...do... | ...do... | 90.1 | 13.3 |
| 14 | $(CH_3)_3A._2Cl_3$ | 0.12 | ...do... | 0.50 | ...do... | ...do... | 79.4 | 2.6 |
| 15 | $(CH_3)_3Al_2Cl_3$ | 0.12 | ...do... | 1.50 | ...do... | ...do... | 81.7 | 4.9 |
| 16 | $(CH_3)_3Al_2Cl_3$ | 0.12 | Dimethyl ether of tetraethylene glycol. | 0.71 | Normal | ...do... | 88.5 | 11.7 |
| 17 | $(CH_3)_3Al_2Cl_3$ | 0.12 | Methyl-ethyl ether of diethylene glycol. | 0.44 | Delay | ...do... | 88.8 | 12.0 |
| 18 | $(CH_3)_3Al_2Cl_3$ | 0.12 | Dimethyl ether of ethylene glycol. | 0.51 | Normal | None | 86.4 | |

The foregoing examples illustrate typical excellent results obtained according to the present process. In addition to the good yields obtained, the ease of operability was clearly increased owing to the fact that the reaction product mixture, or reaction mass is altered in physical properties. This alteration is evidenced not only by the lower chemical reactivity, on exposure to air, which is attained, but also is shown by the ease with which the material can be discharged from a reaction zone. Reaction mass includes not only the tetramethyllead engendered by the process, but also the substantial quantity of finely divided lead particles resultant from the reaction, sodium chloride obtained as a joint product, and the hydrocarbon liquid when employed. The improvement in processability is shown by the examples below:

Example 19

Seven reactions were carried out according to the standard procedure already described employing an aluminum hydrocarbon catalyst and toluene, but not using each operation was attained. Thus, for the catalyst system, methyl aluminum sesquichloride-diethyl ether of diethylene glycol, the average amount of discharge in four sequential operations was 89.5 percent representing a gain in efficiency of over 18 percent, the range being from 87 to 91 percent discharged. A similar series using the catalyst system methyl aluminum sesquichloride and the dimethyl ether of diethylene glycol resulted in an average discharge efficiency of 83 percent, or an improvement of about 12.5 percent. Accordingly, the present invention not only results in good yields of tetramethyllead, but aids the discharge of the products of the reaction from a reaction zone. Similar benefits are, of course incurred in techniques available for the continuous reaction of sodium lead alloy or methyl chloride to obtain tetramethyllead.

To illustrate further the beneficial results obtained, with other examples of the co-catalysts employed according to the present process, the following examples give the results in an additional series of operations.

| Ex. | Aluminum Hydrocarbon Component | | Co-Catalyst | | Catalyst Feed | Hydrocarbon Component, if any | TML Yield, Percent | Yield Increase Over Base Line, Percent |
|---|---|---|---|---|---|---|---|---|
| | Identity | Concentration Al, Wt. Percent of Alloy | Identity | Moles/Gm. Atom. Al | | | | |
| 20 | $(CH_3)_3Al_2Cl_3$ | 0.12 | Dioxane | 0.32 | Normal | Toluene | 86.3 | 9.5 |
| 21 | $(C_2H_5)_3Al$ | 0.12 | ...do... | 1.07 | ...do... | ...do... | 87.2 | 9.3 |
| 22 | $(CH_3)_3Al_2Cl_3$ | 0.12 | 1,4-dioxane | 2.60 | ...do... | ...do... | 80.0 | 3.2 |
| 23 | $(CH_3)_3Al_2Cl_3$ | 0.12 | Dimethyl ether of ethylene glycol. | 0.85 | ...do... | ...do... | 96.5 | 19.7 |
| 24 | $(CH_3)_3Al_2Cl_3$ | 0.12 | Diethyl ether of diethylene glycol and dioxolane.[1] | 1.78 | Delay | ...do... | 93.5 | 16.7 |
| 25 | $(CH_3)_3Al_2Cl_3$ | 0.12 | Dimethyl ether of ethylene glycol and dioxolane.[2] | 1.18 | Normal | ...do... | 91.0 | 14.2 |
| 26 | $(C_2H_5)_3Al$ | 0.12 | Methyl ether of methyl tetrahydrofuran. | About 1 | Mixed | ...do... | 93.9 | About 15 |

[1] Used in approximate equal volume ratio.
[2] Dioxolane in approximately 80 percent volume concentration.

In all the foregoing examples, the reaction masses obtained, prior to removal of the tetramethyllead therefrom, were relatively free-flowing, granular appearing materials. In contrast, in the base-line operations previously discussed, the reaction mixtures were relatively sticky and gummy, as shown by the information previously given on the efficiency of discharge. In addition, in all the above given examples, the reaction masses did not exhibit fuming when exposed to the atmosphere.

To illustrate further additional catalyst combinations employed in other embodiments of the present invention, the following examples are typical illustrations of catalyst systems for the process. When these catalyst systems are employed, similarly beneficial results are obtained.

| Ex. | Aluminum Component | Co-Catalyst | Hydrocarbon added, if any |
|---|---|---|---|
| 27 | $(iC_4H_9)_3Al$ | Dimethyl ether of diethylene glycol. | Aromatic petroleum cut. |
| 28 | $(C_6H_{13})_3Al$ | Dipropyl ether of diethylene glycol. | None. |
| 29 | $(C_{12}H_{20})_3Al$ | Methyl ethyl ether of ethylene glycol. | Toluene. |
| 30 | $(C_6H_5)_3Al$ | Dibutyl ether of diethylene glycol. | 2,2,4-trimethyl hexane. |
| 31 | $(C_4H_9)_2AlH$ | Dihexyl ether of ethylene glycol | 1,2-dimethyl benzene. |
| 32 | $(C_3H_7)_3Al$ | Ethyl ether of methyl tetrahydrofuran. | Propyl benzene. |
| 33 | $(C_2H_5)_3Al$ | Cyclohexyl ethyl diether of diethylene glycol. | None. |
| 34 | $(CH_3)_3Al$ | Phenyl ethyl diether of ethylene glycol. | Toluene. |

As additional examples of catalyst components, which can be used as the second or synergistic catalyst component in place of those specially illustrated above, are: cyclohexyl methyl ether of ethylene glycol, cyclopentyl butyl ether of triethylene glycol, diphenyl ether of tetraethylene glycol, butyl ether of methyl tetrahydrofuran, 2-methyl-1,4-dioxane, methyl dioxolane and others. Additional examples of catalyst system components in which are used a plurality of compounds having the desired glycol ether grouping, are mixtures of dimethyl ether of ethylene glycol and methyl ethyl ether of diethylene glycol, methyl ethyl ether of diethylene glycol with dioxolane, and numerous others.

The reasons for the highly beneficial results obtained by the present process are not fully understood. However, it appears that the effective catalyst systems are actually new compositions representing complex materials between the hydrocarbon aluminum component and the organo component having glycol ether type linkages therein. This is evidenced in several ways. Firstly, when a hydrocarbon aluminum component and one of the co-catalysts involved in the present invention are mixed, extraneous of the reaction system, a homogeneous product usually results. This is particularly marked when the glycol containing material is provided in proportions of approximately one-half mole per mole of the aluminum containing material. However, homogeneous materials are obtained when establishing such admixtures with the glycol materials varying in proportions from one-fourth up to four or five moles per gram atom of aluminum in the aluminum component. The absence of fuming upon formation of such complexes, either prior to utilization in the reaction for synthesizing tetramethyllead, or as evidenced by the attributes of the resultant reaction mass, is indicative of the absence of non-complexed hydrocarbon aluminum bonds of moieties, in as much as these latter are well known to be quite reactive with atmospheric oxygen. Accordingly, the catalyst system employed under the present process represents new and novel compositions of matter utilizable for the indicated process, and also as alkylating agents for reaction with metal salts, or for convenient sources of hydrocarbon-aluminum moieties in an easily handled transportable form.

As evidenced from the examples above, the yields obtained generally represent a significant improvement over the best yields in tetramethyllead synthesis heretofore encountered. Further, it is found that these yields are in excess of mere cumulative yields. Thus, when the dimethyl ether of ethylene glycol was employed in the proportions found effective as a co-catalyst (Example 18) a yield of only 2% was obtained. When the dimethyl ether of diethylene glycol was employed, in the presence of toluene, the yields also encountered were quite low. The benefits of the process are significant not only in the high yields customarily realized but also in the attainment of good yields with a great reduction in the amount of aluminum type catalyst required.

As already shown, the glycol-type linkage containing component can be a single compound or can be, when desired, two or even more compounds. In fact, in some respects, further benefits are thus realized which are particularly advantageous in certain environments. Thus, in Example 24, an approximate equal volume mixture of diethyl ether of diethylene glycol and dioxolane was employed. It is found that the rapidity of reaction in this instance is improved, particularly as evidenced by the speed at which a reaction is initiated. Thus, in the case of four operations using a catalyst system consisting of methyl aluminum sesquichloride and the diethyl ether of diethylene glycol, the average time required before the reaction was proceeding at a realistic rate, after attainment of reaction temperatures, was 53 minutes. In contrast, in three operations wherein the catalyst system included methyl aluminum sesquichloride, and diethyl ether of diethylene glycol in conjunction with dioxolane, as in Example 24, the average time required to initiate reaction at a realistic rate was 31 minutes, representing an improvement of approximately 40 percent.

As previously noted, the present invention not only provides appreciable increase in yield of the maximum yields obtained when using aluminum catalyst as the sole catalyst component, but in addition the yield increase is achieved when using appreciably lower amounts of aluminum-hydrocarbon catalyst. Thus, although the optimum proportions of aluminum catalyst heretofore have been, in certain systems, in the range of about 0.18–0.22 weight percent of aluminum of the sodium lead alloy charged, the examples given above show a high degree of effectiveness is obtained when using, typically, only half as much aluminum catalyst. It will be understood that, although the present invention is permissive of, and results in, high yields, even with low proportions of the aluminum component, than heretofore believed necessary, that a wide range of aluminum or aluminum compound concentration is permissive. Thus, the benefits of the invention are obtained when proportions of aluminum of from about 0.04 to about 0.25 weight percent of the alloy, are used. A preferred range is from about 0.08 to 0.15 weight percent.

The relative amount of the components of the catalyst systems are not highly critical, but are frequently important. Highly effective results are obtained from the low proportions of about one-fourth mole per gram atom of the aluminum in the aluminum-hydrocarbon catalyst component up to as high as five moles per gram atom of aluminum. In particular systems, the relative proportions are more important. In the case of alkyl aluminum chloride or trialkyl aluminum combinations with di-lower alkyl ethers of lower polyethylene glycols, an optimum proportion is found in the range of from one-half to about two moles of the di-lower alkyl ether per atom of aluminum. Thus, in the case of dimethyl ether of diethylene glycol with methyl aluminum sesquichloride, a mole ratio of 1.35–1 resulted in a yield of 94.3 percent (Example 11), even though the aluminum concentration was less than one-tenth weight percent of the alloy. It was found that ratios above and below this level tended to decrease the yield obtained, although as exhibited by the examples, appreciable increase over the best results obtained solely with an aluminum hydrocarbon catalyst were nevertheless realized.

The mode of addition of the catalyst is sometimes important. In the case of a large number of operations using methyl aluminum sesquichloride in conjunction with the dimethyl ether of diethylene glycol, it was found that the yield was not sensitive to the mode of addition. On the other hand, when methyl aluminum sesquichloride and the diethyl ether of diethylene glycol were used together, it was found highly desirable to defer addition of some of the methyl aluminum sesquichloride for several minutes after a portion thereof, with the diethyl ether of diethylene glycol, had been introduced to the reaction zone. The preferred mode of addition for any explicit catalyst system is readily determinable.

What is claimed is:

1. A catalyst system for the preparation of tetramethyllead compounds from a sodium-lead alloy and an alkyl chloride consisting of methyl aluminum sesquichloride and at least one co-catalyst which is an organic compound consisting of carbon, hydrogen and oxygen, said at least one co-catalyst being an organic compound having at least one glycol diether type group and being at least one selected from the class consisting of,
   (a) dihydrocarbon ethers of lower polyethylene glycols having from two to seven glycol groups,
   (b) dihydrocarbon ethers of ethylene glycol,
   (c) lower alkyl ethers of 1,4-dioxane,
   (d) 1,4-dioxane,
   (e) dioxolane,
   (f) lower alkyl dioxolane,
   (g) hydrocarbon ethers of methyl tetrahydrofuran, and
   (h) mixtures thereof,
   the hydrocarbon radicals of the said co-catalysts being radicals selected from the group consisting of alkyl, phenyl, cyclohexyl, and mixtures thereof.

2. A catalyst system for the preparation of tetramethyllead compounds from a sodium-lead alloy and an alkyl chloride consisting of an aluminum catalyst and at least one co-catalyst which is an organic compound consisting of carbon, hydrogen, and oxygen,
   (A) said aluminum catalyst being at least one selected from the group consisting of,
      (1) aluminum,
      (2) aluminum trichloride,
      (3) aluminum tribromide,
      (4) aluminum triiodide,
      (5) a hydrocarbon aluminum compound having at least one hydrocarbon group bonded to aluminum by a carbon-aluminum linkage and being at least one selected from the grouping consisting of,
         (a) trihydrocarbon aluminum compounds,
         (b) hydrocarbon aluminum chlorides,
         (c) hydrocarbon aluminum hydrides,
         (d) hydrocarbon aluminum alkoxides, and
         (e) mixtures thereof, and
      (6) mixtures thereof,
      wherein said at least one hydrocarbon group bonded to aluminum is a hydrocarbon group selected from the class consisting of alkyl, phenyl, and mixtures thereof; and
   (B) said at least one co-catalyst being a lower alkyl ether of methyl tetrahydrofuran, the alkyl group of said lower alkyl ether having from one to about 10 carbon atoms.

3. The catalyst system of claim 1 further characterized by said methyl aluminum sesquichloride being present in a quantity sufficient to provide an aluminum concentration of from about 0.04 to 0.25 weight percent of said sodium-lead alloy.

4. A catalyst system for the preparation of tetramethyllead compounds from a sodium-lead alloy and an alkyl chloride consisting of sufficient methyl aluminum sesquichloride to provide an aluminum concentration of from about 0.04 to 0.25 weight percent of said sodium-lead alloy and sufficient dimethyl ether of diethylene glycol to provide of from about 0.25 to 5 moles per atom of aluminum.

5. A catalyst system for the preparation of tetramethyllead compounds from a sodium-lead alloy and an alkyl chloride consisting of sufficient methyl aluminum sesquichloride to provide an aluminum concentration of from about 0.04 to 0.25 weight percent of said sodium-lead alloy and sufficient diethyl ether of diethylene glycol to provide of from about 0.25 to 5 moles per atom of aluminum.

6. A catalyst system for the preparation of tetramethyllead compounds from a sodium-lead alloy and an alkyl chloride consisting of sufficient methyl aluminum sesquichloride to provide an aluminum concentration of from about 0.04 to 0.25 weight percent of said sodium-lead alloy and sufficient methyl ethyl ether of diethylene glycol to provide of from about 0.25 to 5 moles per atom of aluminum.

7. A catalyst system for the preparation of tetramethyllead compounds from a sodium-lead alloy and an alkyl chloride consisting of sufficient methyl aluminum sesquichloride to provide an aluminum concentration of from about 0.04 to 0.25 weight percent of said sodium-lead alloy and sufficient of a mixture of dimethyl ether of ethylene glycol and dioxolane to provide of from about 0.25 to 5 moles of said mixture per atom of aluminum.

8. A catalyst system for the preparation of tetramethyllead compounds from a sodium-lead alloy and an alkyl chloride consisting of sufficient methyl aluminum sesquichloride to provide an aluminum concentration of from about 0.04 to 0.25 weight percent of said sodium-lead alloy and sufficient of a mixture of diethyl ether of diethylene glycol and dioxolane to provide of from about 0.25 to 5 moles of said mixture per atom of aluminum.

9. A catalyst system for the preparation of tetramethyllead compounds from a sodium-lead alloy and an alkyl chloride consisting of sufficient methyl aluminum sesquichloride to provide an aluminum concentration of from about 0.04 to 0.25 weight percent of said sodium-lead alloy and sufficient 1,4-dioxane to provide of from about 0.25 to 5 moles per atom of aluminum.

10. A catalyst system for the preparation of tetramethyllead compounds from a sodium-lead alloy and an alkyl chloride consisting of sufficient methyl aluminum sesquichloride to provide an aluminum concentration of from about 0.04 to 0.25 weight percent of said sodium-lead alloy and sufficient dimethyl ether of ethylene glycol to provide of from about 0.25 to 5 moles per atom of aluminum.

11. A catalyst system for the preparation of tetramethyllead compounds from a sodium-lead alloy and an alkyl chloride consisting of
   (A) at least one alkyl aluminum compound selected from the group consisting of,
      (1) aluminum trialkyls,
      (2) alkyl aluminum chlorides, (3) alkyl aluminum hydrides, and
(4) alkyl aluminum alkoxides; and
(B) a lower alkyl ether of methyl tetrahydrofuran, each alkyl group of the foregoing Items A and B having from one to about ten carbon atoms.

12. A catalyst system for the preparation of tetramethyllead compounds from a sodium-lead alloy and an alkyl chloride consisting of sufficient triethyl aluminum to provide an aluminum concentration of from about 0.04 to 0.25 weight percent of said sodium-lead alloy and sufficient methyl ether of methyl tetrahydrofuran to provide of from about 0.25 to 5 moles per atom of aluminum.

References Cited

UNITED STATES PATENTS

| | | | |
|---|---|---|---|
| 3,057,897 | 10/1962 | Robinson | 260—437 |
| 3,058,970 | 10/1962 | Rust et al. | 252—429 X |
| 3,108,145 | 10/1963 | Antonsen | 252—429 X |
| 3,129,209 | 4/1964 | Hague et al. | 252—429 X |

DANIEL E. WYMAN, *Primary Examiner.*

TOBIAS E. LEVOW, HELEN M. McCARTHY,
*Examiners.*

J. G. LEVITT, L. G. XIARHOS, *Assistant Examiners.*